United States Patent Office 3,091,949
Patented June 4, 1963

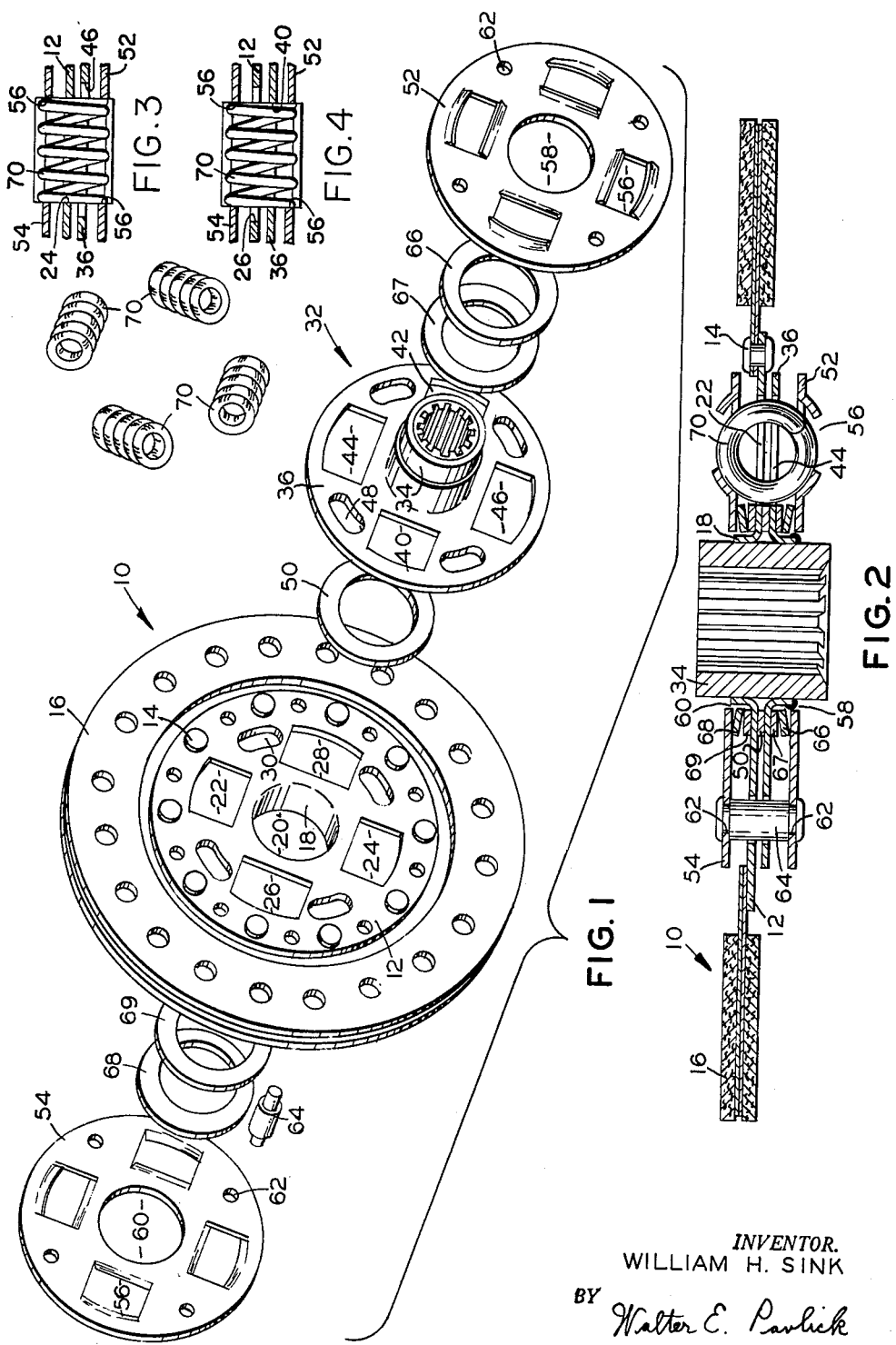

3,091,949
CLUTCH PLATE
William H. Sink, Toledo, Ohio, assignor to Dana Corporation, Toledo, Ohio, a corporation of Virginia
Filed Sept. 30, 1960, Ser. No. 60,255
7 Claims. (Cl. 64—27)

This invention relates generally to power transmitting elements and more specifically to the construction of an element containing a vibration damper for use in vehicle clutches and the like.

Power transmitting elements containing vibration dampers have been widely used in vehicle clutches throughout the industry. The most favored construction consists in drivingly connecting the friction disk driving member to the clutch hub driven member by means of circumferentially disposed compression springs. These springs, while acting as the driving connection, dampen the transmission of vibration and chatter. With this arrangement of the springs, angular displacement of the relative rotational parts is limited to the compressibility of the individual springs since the springs are normally arranged to act in parallel.

Since these springs, though straight, are disposed in a circumferential path, their length must be held relatively short, for if their length is increased appreciably the springs would be bent circumferentially when compressed and thereby interfere with the proper damping action.

It has been observed that in many instances these relatively short springs do not allow sufficient angular displacement of the driving and driven elements to provide proper damping. Since the springs cannot be made appreciably longer to afford greater compressibility with the resultant greater deflection, the present invention has the following objects:

It is an object of this invention to provide a power transmitting element having damping means which permits greater angular displacement.

It is another object of this invention to provide a power transmitting element wherein springs act as dampers. The power transmitting element being of such a construction that at least some of the springs act in series rather than in parallel so that the total angular displacement of the relative rotatable parts is not limited to the compressibility of the individual springs but to the total of the compressibility of the series springs.

It is yet another object of this invention to provide a power transmitting element with improved damping characteristics which is inexpensive and durable.

Still other objects and advantages of this invention will be apparent from the following description and reference to the accompanying drawings in which:

FIG. 1 is an exploded isometric view of certain of the components of the power transmitting element;

FIG. 2 is a cross-sectional view of a power transmitting element embodying this invention; and FIGS. 3 and 4 are fragmentary views of the power transmitting element showing the resilient drive means in full and portions of the components cooperating therewith in section.

The present invention, in its preferred embodiment, provides a driving member having a plurality of circumferentially spaced slots, some of greater elongation than the others. The clutch hub driven member which is rotatable relative to the driving member, also has a plurality of circumferentially spaced slots, some of greater elongation than the others. The long slots on each of the above members are disposed so that they cooperate and are aligned with the short slots of the other member. Reaction plates are also provided with a plurality of circumferentially spaced slots which are similar in size to and cooperate with the short slots of the driving and driven members. A compression spring is disposed in each set of cooperating slots. With this arrangement, the driving member drives the reaction plate through the springs contained in the cooperating short slots and since the longer slots of the driven member are cooperating and aligned with the short slots, it is not drivingly engaged to the driving member; the reaction plate in turn drives the driven member through the springs in their cooperating small slots. In this manner, the total compression of the springs, if all the springs are identical, is twice that of the individual springs and therefore the paired springs are acting in series instead of in parallel, and greater angular deflection between the driving and driven members is obtained.

Referring now to the drawings, wherein the numbers refer to the same parts in all the figures, and more particularly to FIG. 1, the driving member 10 is comprised of a central disk portion 12 which has a friction facing assembly 16 fixedly attached thereto, as by an annulus of rivets 14 or other suitable means. The central disk portion 12 has a flange portion 18 integral therewith which defines a central opening 20. Also defined by the central disk 12 are circumferentially positioned slots 22 and 24 being of substantially the same size and diametrically opposite each other, and circumferentially positioned slots 26 and 28, positioned diametrically opposite each other and displaced 90° from and of greater circumferential elongation than slots 22 and 24. A plurality of circumferentially elongated openings 30 are also defined by the central disk portion 12 and positioned one between each of the aforementioned slots.

The driven member is shown generally at 32 and comprises an internally splined hub portion 34 which has an annular flange 36 integral therewith. In this preferred embodiment the flange 36 is a stamped member and is fixedly attached to the hub 34 by welding as shown more clearly in FIG. 2. The flange 36 is at most of slightly smaller diameter than the diameter of the inner edge of the annulus of rivets 14 in the driving member 10. The flange has circumferentially positioned slots 40 and 42 disposed therein which slots are diametrically opposite each other and of substantially the same size as slots 22 and 24 in the driving member 10. The flange also defines circumferentially positioned slots 44 and 46 which are diametrically opposite each other, displaced 90° from slots 40 and 42, and substantially equal in size to the slots 26 and 28 in the driving member 10. A plurality of elongated circumferentially positioned openings 48 are also defined by the flange 36 and positioned one between each pair of the aforementioned slots in alignment with the openings 30 in the driving member 10.

As clearly shown in FIG. 2, the hub 34 of the driven member 32 is disposed for rotation within the central opening of the driving member 10. Interposed between the flange 36 of the driven member and the central disk portion 12 of the driving member is an annular disk 50 which is frictionally engaged with the flange 36 and the central disk 12 for resisting relative rotation thereof.

A pair of similarly sized reaction plates 52 and 54 each define a plurality of circumferentially positioned slots 56 substantially the same size as slots 40 and 42 in the driven member 32 and slots 22 and 24 in the driving member 10. The reaction plates 52 and 54 are provided with centrally disposed bores 58 and 60 respectively. The plates 52 and 54 each also define a plurality of circumferentially spaced rivet holes 62. As shown in FIG. 2, the hub 34 of the driven member 32 is disposed for rotation within the bores 58 and 60 of the reaction plates 52 and 54. The plates are positioned one on each side of the central disk 12 of the driving member 10 and the flange 36 of the driven member 32 and fixedly interconnected by spacer rivets 64 which fixedly engage the plates 52 and 54 at rivet holes 62. The rivets pass through the elongated openings 30 and 48 in the central disk 12 and flange 36, respectively, and therefore do not interfere with the relative rotation of the drive and driven members. Interposed between plate 52 and flange 36 are a Belleville spring 66 and an annular washer 67, and interposed between plate 54 and central disk 12 are, likewise, a Belleville spring 68 and an annular washer 69. The Belleville springs 66 and 68 and washers 67 and 69 frictionally engage the adjacent parts and resist relative rotation thereof.

As clearly shown in the drawings and more particularly FIGS. 1, 3 and 4, the reaction plates 52 and 54, the driving member 10, and driven member 32 are disposed so that the slots of greater elongation 26 and 28 in the disk portion 12 of the driving member 10 are aligned and cooperate with the lesser elongated slots 40 and 42 in the flange 36 of the driven member 32 and a pair of the slots 56 in each plate 52 and 54; the lesser elongated slots 22 and 24 in the disk portion 12 of the driving member 10 are respectively aligned and cooperate with the greater elongated slots 44 and 46 in the flange 36 of the driven member 32 and the remaining slots 56 in the reaction plates 52 and 54. A drive or cushion spring 70 is disposed in each of the above defined sets of cooperating slots to provide a resilient or vibration dampened drive between the drive and driven members.

The driving member 10 is drivingly engaged to reaction plates 52 and 54 by means of the springs 70 disposed in slots 22 and 24 in the driving member and in the aligned, cooperating slots 56 in the reaction plates 52 and 54. The driven member 32 is not engaged by these springs because the slots 44 and 46 in the driven member are of greater elongation than the slots 22, 24 and 56 and the spring 70 contained therein. The reaction plates 52 and 54 are in turn drivingly engaged to driven member 32 by means of the springs 70 disposed in the slots 40 and 42 in the driven member 32 and in the aligned, cooperating slots 56 in the reaction plates 52 and 54. Similarly, the driving member 10 is not engaged by the springs 70 because the slots 26 and 28 in the driving member are of greater elongation.

It is now apparent that the driving member 10 can drive the reaction plates 52 and 54 and move rotationally relative thereto to the extent of the compression of the springs 70 drivingly connecting the two and that the reaction plates 52 and 54 can in turn drive the driven member 32 and move rotationally relative thereto to the extent of the compression of the springs connecting the reaction plates and the driven member. The result is that the total angular displacement of the driving and driven members is double that which is normally obtained from springs acting in parallel since the relative rotation obtained is that allowed by the compression of two pairs of springs acting in series.

When all four springs are of the same weight the result is double amplitude displacement; when the reacting pairs of springs are of unlike weight a variable amplitude of displacement can be obtained.

It is apparent that a power transmitting element has been described which fulfills the objects of the invention and provides greater angular displacement since the reacting pairs of springs act in series rather than in parallel. The preferred embodiment of the invention has been illustrated and described, but changes and modifications can be made, and it is understood that this showing and description is illustrative only and not for the purpose of rendering the invention as limited to the details illustrated or described except insofar as it has been limited by the terms of the following claims.

What is claimed is:

1. A power transmitting device comprising a driving member having a plurality of circumferentially spaced circumferentially elongated slots, some of said slots being of greater circumferential elongation than others, a driven member in spaced relationship and rotatable relative to said driving member and having a plurality of circumferentially spaced circumferentially elongated slots cooperating with said slots in said driving member, some of said slots in the driven member being of greater circumferential elongation than others, reaction means in spaced relationship and rotatable relative to said members and having a plurality of circumferentially spaced slots cooperating with said slots in said driving and driven members, and a resilient means disposed in each of said cooperating slots, said driving member driving said driven member through said reaction means and at least a pair of said resilient means acting in series.

2. A power transmitting device according to claim 1 which includes friction means disposed between said members to resist the relative rotation thereof.

3. A power transmitting device comprising a driving member having a central opening and having a first and second circumferentially spaced slot; said second slot being of greater circumferential elongation than said first slot, a driven member disposed for rotation in said central opening and having a flange connected thereto for rotation therewith, said flange having a first slot similar in size to the first slot in said driving member and a second slot of greater circumferential elongation than said first slot, said driven member and said driving member disposed in spaced relationship with said slot of greater circumferential elongation in said driven member cooperating with said first slot in said driving member and said slot of greater circumferential elongation in said driving member cooperating with said first slot in said driven member, a reaction member having a central opening and being disposed for rotation on said hub, said reaction member having a plurality of circumferentially spaced slots similar in size to and cooperating with said first slots defined by said driving and driven members, and resilient means disposed in each of said cooperating slots whereby said resilient means act in series to transmit torque between said driving and driven members upon the relative rotation thereof.

4. A power transmitting device comprising a driving member having a central opening and having a first plurality of circumferentially spaced slots and a second plurality of circumferentially spaced slots of greater circumferential elongation than said first plurality of slots, a driven member disposed for rotation in said central opening and having a flange integral therewith, said flange having a first plurality of circumferentially spaced slots similar in size to the first plurality of slots in said driving member and a second plurality of slots of greater circumferential elongation than said first plurality of slots, said driven member and said driving member being disposed in spaced relationship so that said slots of greater circumferential elongation in the driven member cooperate with said first plurality of slots in said driving member and said slots of greater circumferential elongation in said driving member cooperate with said first plurality of slots in said driven member, a reaction member having a central opening and being disposed for rotation on said driven member, said reaction member having a plurality of circumferentially spaced slots similar in size to the first plurality of slots defined by the driving and driven members and being arranged in spaced relationship with said driving and driven members so that said slots cooperate with the plurality of slots in said driven and driving members, annular friction members disposed between said reaction, driving, and driven members to oppose the relative rotation thereof, and a single resilient means disposed in each of said cooperating slots whereby at least a pair of said resilient means act in series to transmit torque between said driving and driven members upon relative movement thereof.

5. A clutch element comprising a driving member having a central opening and having a first and second plurality of circumferentially spaced slots, said second plurality of slots being of greater circumferential elongation than said first plurality of slots, a driven hub member disposed for rotation in said central opening and having a flange integral therewith, said flange having a first plurality of circumferentially spaced slots similar in size to the first plurality of slots in said driving member and a second plurality of circumferentially spaced slots of greater circumferential elongation than said first plurality of slots, said driven and said driving members being disposed in juxtaposed relationship and positioned so that said slots of greater circumferential elongation in the driven member cooperate with the first plurality of slots in said driving member and said slots of greater circumferential elongation in said driving member cooperate with said first plurality of slots in said driven member, a plurality of reaction members each having a central opening and being disposed for rotation on said hub, one of said reaction members being disposed on each side of said driving and driven members and each having a plurality of circumferentially spaced slots similar in size to and cooperable with the first plurality of slots in said driving and driven members, means fixedly interconnecting said reaction members, and resilient means positioned in each of said cooperating slots so that said driving member drivingly engages said reaction member which in turn drivingly engages said driven member and said members rotate relative to each other with at least a pair of said resilient means acting in series.

6. A clutch element comprising an annular driving member adapted to have friction facing positioned outwardly thereon, said driving member having a central opening and having a first plurality of circumferentially spaced slots and a second plurality of circumferentially spaced slots of greater circumferential elongation than said first plurality of slots, said slots being located between said central opening and the friction facing, a driven hub member disposed for rotation in said central opening and having an annular flange integral therewith, said flange having a first plurality of circumferentially spaced slots similar in size to the first plurality of slots in said driving member and a second plurality of circumferentially spaced slots of greater circumferential elongation than said first plurality of slots, said driven and driving members adapted to have annular friction means disposed therebetween to resist the relative rotation thereof, said driven and driving members disposed so that said slots of greater circumferential elongation in said driven member cooperate with said first plurality of slots in said driving member and said slots of greater circumferential elongation in said driving member cooperate with said first plurality of slots in said driven member, a pair of annular reaction members each having a central opening and being disposed for rotation on said hub, said reaction members having a plurality of circumferentially spaced slots similar in size to and cooperating with the first plurality of slots in said driving and driven members, one of said reaction members being disposed on each side of said driven and driving members, means fixedly interconnecting said reaction members, a single resilient means positioned in each of said cooperating slots, so that said driving member drivingly engages said reaction member which in turn drivingly engages said driven member and said members rotate relative to each other with at least a pair of said resilient means acting in series.

7. A power transmitting device comprising a driving member having a first and a second circumferentially spaced slot, said second slot being of greater circumferential elongation than said first slot, a driven member having a first slot and a second slot of greater circumferential elongation than said first slot, said driven member and said driving member being co-axial and disposed in spaced relationship with said slot of greater circumferential elongation in said driven member cooperating with said first slot in said driving member and said slot of greater circumferential elongation in said driving member cooperating with said first slot in said driven member, a reaction member co-axial with and disposed in spaced relationship relative to said members, said reaction member having a plurality of circumferentially spaced slots similar in size to and cooperating with said first slots in said driving and driven members, and resilient means disposed in each of said cooperating slots, said resilient means transmitting torque in a series relationship between said driving and driven members upon the relative rotation thereof.

References Cited in the file of this patent

UNITED STATES PATENTS

| | | |
|---|---|---|
| 2,276,416 | Nutt | Mar. 17, 1942 |
| 2,574,573 | Libby | Nov. 13, 1951 |
| 2,636,363 | Nutt | Apr. 28, 1953 |
| 2,895,316 | Kloud | July 21, 1959 |

FOREIGN PATENTS

| | | |
|---|---|---|
| 1,152,807 | France | Sept. 9, 1957 |